United States Patent
Kishinevsky et al.

(10) Patent No.: US 9,792,229 B2
(45) Date of Patent: *Oct. 17, 2017

(54) PROTECTING A MEMORY

(71) Applicant: Intel Corporation, Santa Clara, CA (US)

(72) Inventors: Eugene M. Kishinevsky, Hillsboro, OR (US); Siddhartha Chhabra, Hillsboro, OR (US); Men Long, Beaverton, OR (US); Jungju Oh, San Jose, CA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/669,226

(22) Filed: Mar. 27, 2015

(65) Prior Publication Data

US 2016/0285892 A1    Sep. 29, 2016

(51) Int. Cl.
*H04L 29/06* (2006.01)
*G06F 12/14* (2006.01)
*G06F 21/00* (2013.01)

(52) U.S. Cl.
CPC .......... *G06F 12/1408* (2013.01); *G06F 21/00* (2013.01); *G06F 2212/1052* (2013.01)

(58) Field of Classification Search
CPC .............. H04L 63/123; H04L 63/0853; H04L 63/0876; G06F 12/1408; G06F 2212/1052; G06F 21/00
See application file for complete search history.

(56) References Cited

U.S. PATENT DOCUMENTS

| | | | |
|---|---|---|---|
| 5,724,428 A | 3/1998 | Rivest | |
| 6,539,092 B1 | 3/2003 | Kocher | |
| 8,588,425 B1 * | 11/2013 | Harwood | H04L 9/0894 380/278 |
| 8,799,673 B2 | 8/2014 | Savagaonkar et al. | |
| 9,064,124 B1 | 6/2015 | Davis et al. | |

(Continued)

FOREIGN PATENT DOCUMENTS

| | | | |
|---|---|---|---|
| KR | 10-2013-0067849 | 6/2013 | |
| WO | WO2013002789 | * 1/2013 | ............ G06F 21/24 |
| WO | WO2013/100965 | 7/2013 | |

OTHER PUBLICATIONS

U.S. Appl. No. 14/699,235, filed Mar. 26, 2015, entitled "Providing Enhanced Replay Protection for a Memory," by David M. Durham, et al.

(Continued)

*Primary Examiner* — Catherine Thiaw
(74) *Attorney, Agent, or Firm* — Trop, Pruner & Hu, P.C.

(57) ABSTRACT

In an embodiment, a processor includes: at least one core to execute instructions; and a memory protection logic to encrypt data to be stored to a memory coupled to the processor, generate a message authentication code (MAC) based on the encrypted data, the MAC to have a first value according to a first key, obtain the encrypted data from the memory and validate the encrypted data using the MAC, where the MAC is to be re-keyed to have a second value according to a second key and without the encrypted data. Other embodiments are described and claimed.

13 Claims, 9 Drawing Sheets

(56) References Cited

U.S. PATENT DOCUMENTS

| | | |
|---|---|---|
| 2001/0033656 A1 | 10/2001 | Gligor et al. |
| 2003/0145118 A1* | 7/2003 | Volpano ............... H04L 9/3242 709/249 |
| 2003/0200450 A1* | 10/2003 | England ............. G06F 21/6218 713/189 |
| 2004/0059967 A1* | 3/2004 | Kleppel ............. H04L 12/4013 714/52 |
| 2007/0130470 A1 | 6/2007 | Blom et al. |
| 2007/0245147 A1 | 10/2007 | Okeya |
| 2008/0117679 A1 | 5/2008 | Srinivasan et al. |
| 2008/0232581 A1 | 9/2008 | Elbaz et al. |
| 2009/0048976 A1* | 2/2009 | Hars ................ G11B 20/00086 705/50 |
| 2009/0147947 A1* | 6/2009 | Ingimundarson ..... H04L 9/0643 380/29 |
| 2009/0187771 A1 | 7/2009 | McLellan et al. |
| 2011/0154029 A1 | 6/2011 | Hahn et al. |
| 2011/0154059 A1* | 6/2011 | Durham ................ G06F 21/72 713/190 |
| 2013/0212390 A1* | 8/2013 | Du ....................... H04L 9/3271 713/168 |
| 2014/0208109 A1 | 7/2014 | Trivedi et al. |
| 2014/0223197 A1 | 8/2014 | Gueron et al. |
| 2014/0289539 A1 | 9/2014 | Osterwalder et al. |
| 2015/0006789 A1 | 1/2015 | Buer |
| 2015/0095661 A1* | 4/2015 | Sell .................... G06F 12/1009 713/193 |
| 2016/0140357 A1 | 5/2016 | Newell |
| 2016/0248588 A1 | 8/2016 | Langhammer |

OTHER PUBLICATIONS

International Searching Authority, "Notification of Transmittal of the International Search Report and the Written Opinion of the International Searching Authority," mailed Jun. 20, 2016 in International application No. PCT/US2016/021906.

United States Patent and Trademark Office, Office Action mailed Dec. 2, 2016 in U.S. Appl. No. 14/669,235.

\* cited by examiner

PROTECTING A MEMORY

TECHNICAL FIELD

Embodiments relate to protection for a memory.

BACKGROUND

Memory-based attacks on computing systems are a growing concern. Due to a lack of confidentiality, integrity, and rollback protection, a wide range of attacks are possible to steal valuable data (particularly when stored in a memory) and gain control of a system. Existing solutions either provide partial protection in an effort to decrease performance overheads or provide more robust protection, but with high performance and storage overheads, which present barriers to widespread adoption.

DETAILED DESCRIPTION

Embodiments provide a set of techniques to enforce confidentiality, integrity, and rollback protection for memory systems with low latency, bandwidth, and storage overheads. As a result, embodiments can be leveraged for a wide range of applications and scaled better to accommodate future products. More specifically, embodiments provide Total Memory Protection (TMP) techniques so that all information to be provided to a memory coupled to a main system processor such as a central processing unit (CPU), system-on-chip (SoC) or other multicore processor is protected by confidentiality, integrity checking and rollback protection mechanism.

In an embodiment, all data sent from a processor to an off-chip memory, such as dynamic random access memory (DRAM) and/or non-volatile random access memory (RAM), may be encrypted using XEX-based tweaked-codebook mode with ciphertext stealing, so-called XTS-Advanced Encryption Standard (XTS-AES) encryption to provide confidentiality. More generally, any encryption scheme that does not incur storage overheads to provide confidentiality could be leveraged. Examples of such techniques include: electronic codebook (ECB), or other AES modes including LRW, XEX, or XTS. Integrity may be performed, in an embodiment, by generating an integrity value such as a message authentication code (MAC) for each data segment sent to memory. In order to achieve good collision avoidance between the MACs, at least a 56-bit (b) MAC can be generated for each 64 byte (B) cache line. The resulting storage overhead is approximately 10%. Rollback protection may be realized without expensive counter storage by performing periodic regeneration of the encryption keys used to generate the MAC values (also referred to herein as MAC keys) and regeneration of the MACs themselves. Note that the entire protected memory range does not have to be re-keyed since it is sufficient to update the MACs themselves, which in an embodiment only consumes approximately 10% of the protected storage.

With a relatively low 10% storage overhead and low performance overhead, embodiments may be usable across an entire system memory range, and scalable across a wide range of products, extending from portable devices to server platforms and future usages having high memory bandwidth requirements. The anti-rollback protection may ensure that there is no deterministic way for an attacker to replay data lines without detection. Embodiments thus provide strong security guarantees at minimal performance overheads.

Embodiments may realize a low-overhead scalable solution for providing confidentiality, integrity, and rollback protection for system memory by avoiding use of counter-based encryption techniques. Without counters, MAC storage overhead is relatively low, enabling a periodic re-keying of MACs for rollback prevention. In contrast to counter-mode encryption, which is independent of the data (to be encrypted) itself, embodiments may leverage a data dependent (non-counter) mode encryption. As such, embodiments also avoid use of an integrity tree, which can increase storage overhead and additional bandwidth overhead to obtain tree results in addition to requested data.

In addition, bandwidth overhead of the memory protection may be relatively low, as each memory access may include at most one other access to read/write the MAC. Some additional bandwidth and latency overheads will be incurred for re-keying the MACs, but for many applications the majority of this traffic will be performed during the idle periods, and thus traffic overheads can be prevented during bursts of latency critical traffic. In some implementations, local caching of MAC values, e.g., in a dedicated cache memory of a processor, can decrease the bandwidth overhead even lower.

In order to keep the MAC computational latency out of a critical read path, the MAC can be computed based on ciphertext rather than plaintext. Such a design may add latency to a non-critical write path since MAC computation begins after the encryption is complete. However, this design allows a MAC check to start immediately after the ciphertext arrives on the read return path. If the MAC arrives on the following cycle after the ciphertext from system memory then read response latency overhead due to the integrity check can be masked. More specifically this masking can be realized by performing the MAC comparison during a final cycle of a read response pipeline where arbitration occurs. If the read response pipeline does not have an extra cycle to absorb this latency, a lazy authentication can be used to hide this latency. In this scenario, the read response data can be sent back to a requester (e.g., core) assuming that authentication will succeed. If the MAC check fails, then a fault condition is triggered to prevent any corrupted data from being committed into permanent system state.

Rollback protection can be implemented in which an attacker cannot deterministically rollback the protected memory. In order to provide the rollback protection, the MAC associated with each data line is a keyed MAC. In different embodiments, a Secure Hash Algorithm (SHA) or message digest algorithm (MD5)-based keyed-hash MAC (HMAC) can be used. Rollback protection is provided by periodic re-keying of the MAC values. In order to keep the overheads of this operation low, the key used to generate MACs may slowly and continuously change throughout the memory region. A moving pointer is maintained to move through the MAC part of the memory range. Any MAC stored in a location above the pointer is in the new key's range, and the MACs below the pointer are still in the old key's range. In such embodiment, no more than two keys are live at any given point, keeping the complexity low. Note that a rollback attack may be possible during the period between key updates for a given MAC, referred to as a rollback window. However, this window size is non-deterministic and relatively short (e.g., on the order of some number of minutes), thereby significantly increasing the complexity and reducing the probability of conducting a successful memory rollback attack.

Figure 1:
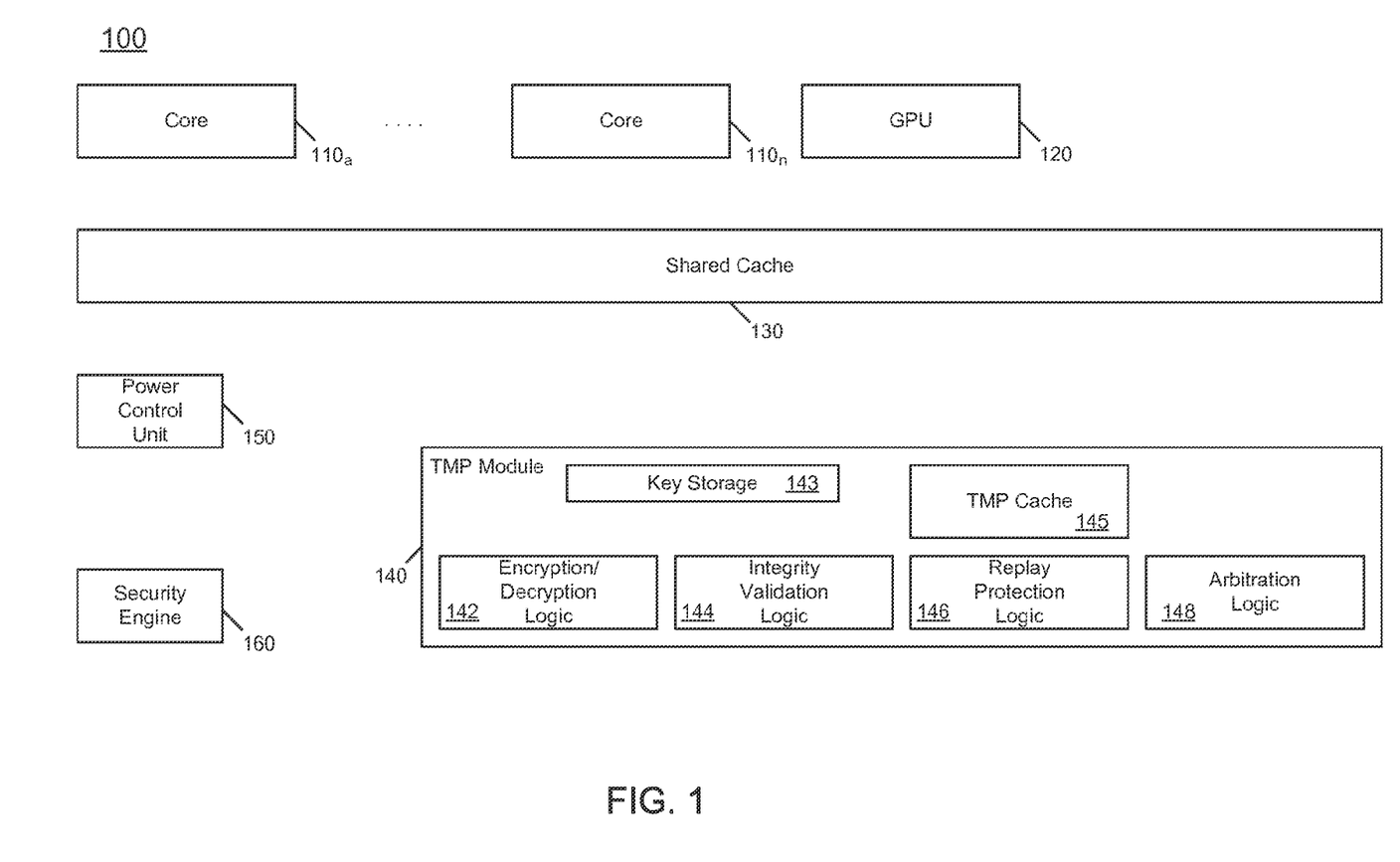
FIG. 1 is a block diagram of a processor in accordance with an embodiment.

Referring now to FIG. 1, shown is a block diagram of a processor in accordance with an embodiment. As shown in FIG. 1, processor 100 is implemented as a multicore processor and may take the form of a system-on-chip (SoC) or other multicore processor. As an example, embodiments may be used in a many-core processor suitable for incorporation in a variety of computing systems, ranging from portable devices such as smartphones, tablet computers and so forth to client computer systems and server computer systems.

As illustrated, processor 100 includes a plurality of cores 110a-110n. In different embodiments, cores 110 may be a set of homogeneous cores or a mix of heterogeneous cores. In some cases, cores 110 may be implemented as in-order, out-of-order or combinations of such cores. In addition, a graphics processing unit (GPU) 120 is present. In some cases, a single graphics processor is provided to perform specialized graphics processing using a different pipeline architecture than for cores 110. Of course understand that in some cases, multiple GPUs may be provided while in other cases, a processor may not include a dedicated GPU.

A shared cache 130 couples to the various processing cores. In an embodiment, shared cache 130 may be a last level cache (LLC) that is shared between the various cores and graphics processor. Understand further that additional levels of a cache hierarchy may be present within the cores themselves, such as private level one and level two caches internal to the cores or graphics processor. Of course other cache architectures may exist in other embodiments.

For purposes of performing total memory protection as described herein, a total memory protection (TMP) module 140 is present. Understand that TMP module 140 may be implemented as appropriate combinations of hardware, software and/or firmware. In different processor implementations, the circuitry of TMP module 140 may be implemented in a standalone fashion to act as an interface between shared cache 130 and a given memory coupled to processor 100 such as a dynamic random access memory (DRAM) or other such system memory. In other cases, TMP module 140 may be implemented within an integrated memory controller of processor 100 that acts to provide an interface and control for the associated memory. In yet other cases, TMP module 140 may be implemented within a memory execution engine (MEE) that may be part of a trusted portion of processor 100 such as circuitry within a security coprocessor, manageability engine or so forth configured to operate in a trusted execution environment. Of course other implementations of TMP module 140 and its constituent components are possible.

With further reference to FIG. 1, TMP module 140 itself is implemented with various individual circuits or components. As described further herein, module 140 may include a variety of different logic units configured with appropriate hardware, software and/or firmware. As illustrated, an encryption/decryption logic 142 may be configured to perform encryption and decryption operations for TMP purposes. In addition, an integrity validation logic 144 may be configured to perform integrity validation functions as described herein. More specifically, integrity validation logic 144 may generate an integrity value for given portions of data to be sent to the memory. In one embodiment, integrity validation logic 144 may be configured to generate a MAC for each corresponding portion of data. In addition, when data is returned from memory, integrity validation logic 144 may check the corresponding integrity value (e.g., by comparison with a validation integrity validation generated based on the returned data) to verify that the data has not been compromised. A replay protection logic 146 may be configured to provide replay protection by way of re-keying or other re-authentication operations, which in an embodiment may be performed according to a predetermined schedule or after predetermined time periods. Still further, an arbitration logic 148 may be configured to perform arbitration operations between a variety of different memory operations, including read and write operations, as well as re-keying operations such as performed as described herein.

As further shown in FIG. 1, TMP module 140 may include a variety of storages. Specifically shown in TMP module 140 is a key storage 143 and a TMP cache memory 145. Key storage 143 may be configured to store keys used to generate MACs. In an embodiment in which re-keying is performed to provide rollback protection, key storage 143 may include at least two entries, each to store one of two keys, where a first key is an old key that was used to encrypt MACs and a second key is a new key used to perform a re-keying operation as MACs within a storage undergo a re-keying cycle. In some cases, upon completion of a full re-keying cycle, the old key may be deleted and a new key to be used for a next re-keying cycle may be stored in the first entry. As further shown in FIG. 1, TMP module 140 includes TMP cache memory 145. In an embodiment, cache memory 145 may be configured to store MACs such that off-chip access latency can be avoided for re-keying operations. Of course other TMP-associated data may be stored in TMP cache memory 145.

As further illustrated in FIG. 1, processor 100 may include other components such as a power control unit 150, which may be implemented in one embodiment as one or more microcontrollers to perform power management operations, such as the independent control of operating frequency and/or voltage for each of cores 110 and GPU 120. In addition, a security engine 160 may be present. In some cases, security engine 160 may be implemented as a separate coprocessor to perform security operations. In some cases, a TMP module may leverage certain capabilities of security engine 160, such as encryption capabilities. That is, in another embodiment, rather than having a dedicated encryption/decryption logic 142 within TMP module 140, encryption/decryption operations instead may be performed within security engine 160. Understand while shown at this high level in the illustration of FIG. 1, many variations and alternatives are possible.

Figure 2:
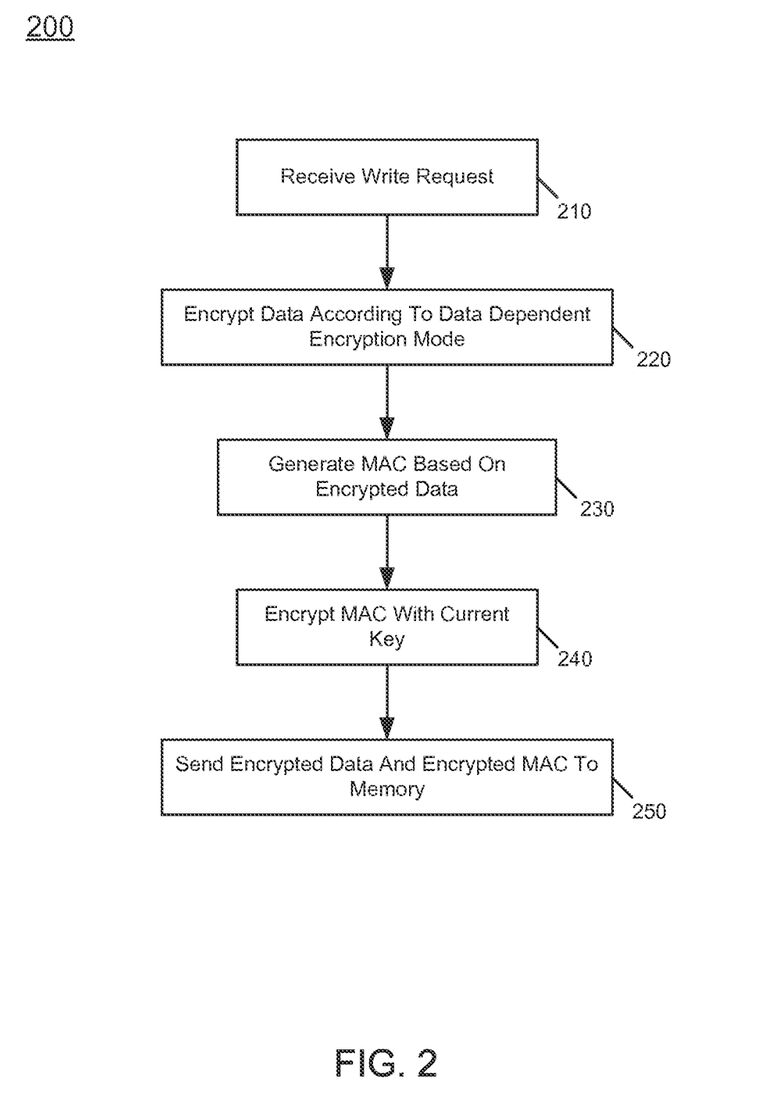
FIG. 2 is a flow diagram of a method for handling a write operation in accordance with an embodiment of the present invention.

Referring now to FIG. 2, shown is a flow diagram of a method for handling a write operation in accordance with an embodiment of the present invention. In the embodiment shown in FIG. 2, method 200 may be performed at least in part by a TMP module as described herein. Method 200 begins by receiving a write request (block 210). In an embodiment, such write request may be received responsive to execution of a write instruction to write a particular amount of data (e.g. a cache line width amount) to memory. Control next passes to block 220 where the data of the write request may be encrypted. More specifically, such encryption may be performed according to a data dependent encryption mode, such as an XTS-AES mode. Of course understand that in other embodiments different types of data dependent encryption modes may be used.

Thereafter at block 230 a MAC may be generated based on this encrypted data. In various embodiments different MAC generation processes may be used. In one particular embodiment, a 56-bit MAC value may be generated for a cache line width of data to be written to the memory. Thereafter, this MAC value itself may be encrypted (block 240). More specifically, the TMP module may store a current encryption key, which in an embodiment may take the form of a 128-bit key. This current encryption key may be used to encrypt the MAC. Thereafter at block 250 the encrypted data and the encrypted MAC both may be sent to memory. In an embodiment, these different pieces of information may be sent under control of an arbitration logic, which may arbitrate these memory write operations with other memory operations. Understand while shown at this high level in the embodiment of FIG. 2, many variations and alternatives are possible.

Figure 3:
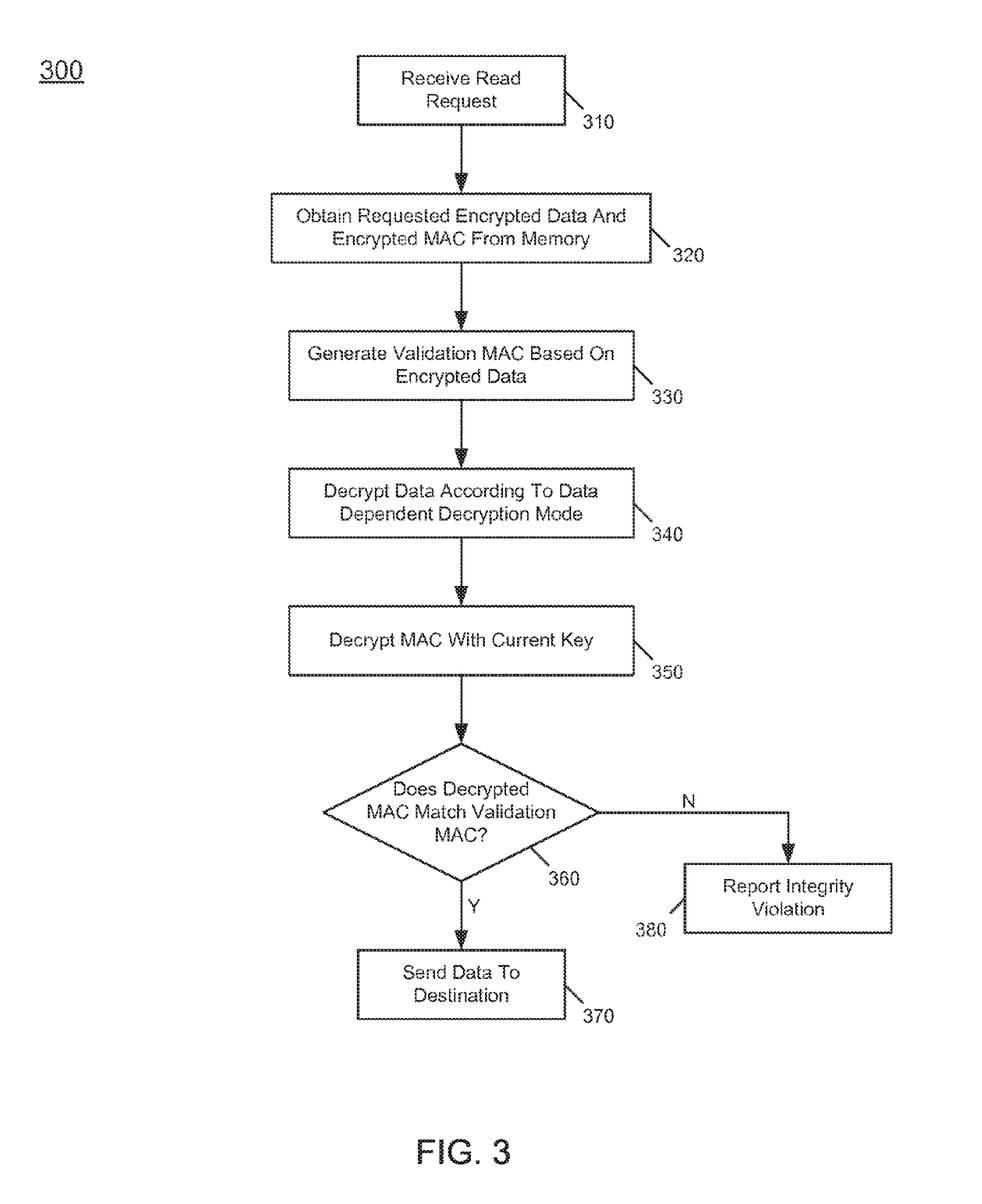
FIG. 3 is a flow diagram of a method for handling a read operation in accordance with an embodiment of the present invention.

Referring now to FIG. 3, shown is a flow diagram of a method for handling a read operation in accordance with an embodiment of the present invention. In FIG. 3, method 300 may be performed by a TMP module responsive to a read request such as a read instruction to read a particular data portion from the memory. As seen, method 300 begins by receiving a read request (block 310). Responsive to this request, control passes to block 320 where the encrypted data and a corresponding encrypted MAC may be obtained from the memory. Understand that such operations may be performed as scheduled by an arbitration logic, which arbitrates between these operations and other pending memory operations.

Thereafter various operations are performed to process the obtained information. Understand while shown with a linear flow for ease of illustration, in many embodiments various of these operations can be performed in parallel. Specifically, at block 320 a validation MAC may be generated. More specifically, this validation MAC may be generated based on the encrypted data. In an embodiment, the same operations as described above with regard to original MAC generation may be used to generate this validation MAC. As in the above example, e.g., a 56-bit MAC value may be generated using the encrypted data and a current encryption key. At block 340 the data itself may be decrypted according to a data dependent encryption mode. In accordance with the above discussion, in an embodiment an XTS-AES decryption may be performed. At block 350, the received encrypted MAC itself may be decrypted, also with the current key. Understand that these operations at blocks 330, 340 and 350 may be performed in parallel, in some cases.

Still with reference to FIG. 3, control next passes to diamond 360 where it is determined whether the decrypted MAC value matches the validation MAC value. If so, the integrity of the obtained data is verified and at block 370 the data is sent to the destination or requester (e.g., a core). Otherwise an integrity violation is reported (block 380) and thus the data is not provided to the destination. Understand that in some cases to reduce latency upon decryption, the data may be sent to the destination and if an integrity violation is thereafter determined (at diamond 360) the integrity violation report may be generated at block 380 and a fault signal may be sent to the destination to prevent the earlier sent decrypted data from being committed to a state of the machine. Understand while shown at this high level in the embodiment of FIG. 3, many variations and alternatives are possible.

To provide rollback protection, MAC values may periodically be re-keyed so that a compromised MAC value recorded at an earlier time cannot later be replayed (at least outside of a re-keying time window) without raising an integrity violation. Different manners of performing re-keying may be performed in different embodiments. In some embodiments, the original data used to generate an original MAC value (and the MAC value itself) may be used to generate a new or re-keyed MAC value. In other cases, a re-keyed or new MAC value can be generated without using the associated data, potentially reducing complexity, bandwidth requirements and so forth.

In an embodiment when the TMP module is idle, it starts traversing through the range of MACs with the new key, regenerating each MAC in the process. If there is not sufficient idle time to update the MACs dynamically, an urgency-based mechanism may be activated to schedule MAC updates. In this scenario, sets of MACs that are scheduled for an update with the new key may have an increasing urgency value calculated. In turn, an arbitration logic may compare MAC update access urgency values against other memory traffic urgency values, and when their urgency values becomes high enough, the re-keying operations will be selected, even if lower priority memory traffic is stalled. While this rollback prevention mechanism is non-deterministic, it is possible to define an upper bound on how long each key window might be live before an update occurs.

Using an embodiment, latency critical high-priority bursts of memory traffic will not be impacted by replay protection overheads, as at least some of the rollback protection overhead can occur during idle periods of memory traffic. Additionally, the arbitration-based technique allows low-priority memory accesses to be impacted first, while letting high-priority traffic proceed. Note that the rollback time window can be configured differently for applications having varying security and other features, trading off performance overheads for a shorter rollback window.

Figure 4:
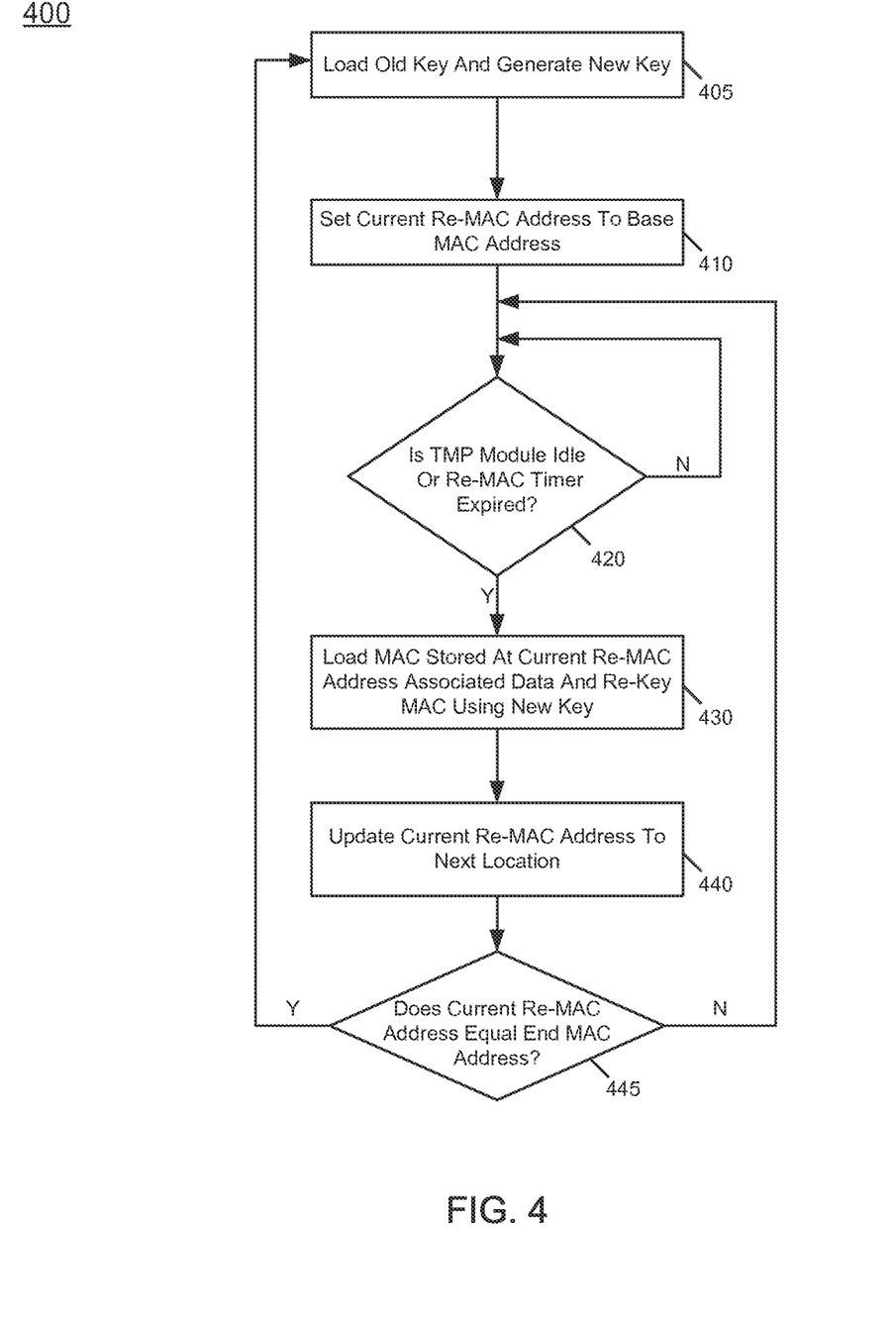
FIG. 4 is a flow diagram of a re-keying method in accordance with one embodiment of the present invention.

Referring now to FIG. 4, shown is a flow diagram of a re-keying method in accordance with one embodiment of the present invention. In the embodiment shown in FIG. 4, method 400 may be performed to re-key MAC values using both the original MAC value and its associated data. When using a keyed MAC algorithm the associated data lines are also to be loaded and used to perform a re-keying. That is, while only 10% of memory is re-keyed, the remaining memory is also loaded to compute the new MAC (which is data dependent) with the new key. In an embodiment, a TMP module may be configured to perform method 400. As seen, method 400 begins by loading an old key and generating a new key (block 405). In an embodiment, this old key may be stored in a storage of the TMP module itself. The new key may be generated according to common key generation practices, utilizing a random number generator, hardware specific seed, and some cryptographic primitives to increase the entropy of the key. Similarly, the new key also may be stored in a storage of the TMP module. At block 410, a current re-MAC address may be set to a base MAC address. This current re-MAC address acts as a pointer to a particular location in a storage that includes the MAC values, and the base MAC address may be the address within the storage at which the first generated MAC value is stored. In the embodiment of FIG. 4, this storage may be a system memory. In other cases, the memory may be a cache memory of the processor such as a dedicated MAC storage.

In any case, control next passes to diamond 420 to determine whether the TMP module is idle or a re-MAC timer has expired. In an embodiment, this re-MAC timer may be set at a configurable value to provide an appropriate level of rollback protection. Understand that the lower the value of this timer, the greater the protection that is afforded, while at the same time, the greater the impact on performance due to re-keying operations. In a particular embodiment, this re-MAC timer may be set on the order of approximately a given number of minutes (which may be on the order of many billions of processor clock cycles). If it is determined that this timer has expired or the TMP module is idle (and thus at an ideal time to perform re-keying), control passes to block 430. At block 430 a MAC stored in the current MAC address may be loaded, along with its associated data. Using this information, the MAC may be re-keyed and the resulting new MAC may be stored at the current MAC address. To perform this re-keying the MAC validation regenerates the original MAC based on the original key and data. If the regenerated MAC matches the MAC loaded from memory, then the validation is successful and a new MAC may be generated. The new MAC is generated based on the new key and data. The new MAC is then written back to memory, replacing the original MAC.

Next control passes to block 440 where the current re-MAC address may be updated to a next location to provide a pointer to the next MAC stored in the memory. Control passes then to diamond 445 to determine whether the current MAC address reaches the end of the region of memory holding the MAC values. If so, the current iteration of re-keying is completed and control passes back to block 405 above, to be performed during a next re-keying iteration. Otherwise, control passes to diamond 420 where a re-keying operation for a next MAC within the storage is performed.

Figure 5:
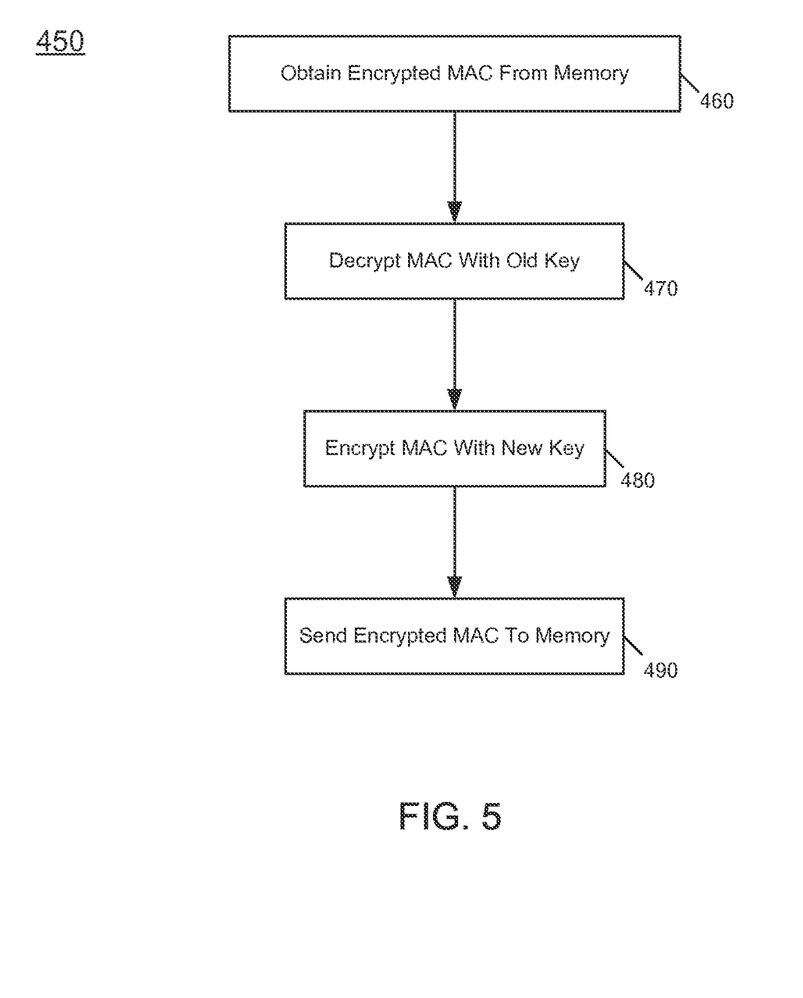
FIG. 5 is a flow diagram of a re-keying method in accordance with another embodiment of the present invention.

As discussed above the re-keying of FIG. 4 uses both the original MAC value and the associated data and thus the bandwidth of obtaining the data is incurred. In other cases, a re-keying operation may be performed without the associated data. In this example, a MAC algorithm such as a SHA or MD5 algorithm may be used. However, the final MAC is generated by encrypting this MAC value with the current MAC key. This differs from a standard keyed MAC construction (e.g., SHA-based HMAC) as the data need not be available for re-keying. Referring now to FIG. 5, shown is a flow diagram of a re-keying method in accordance with another embodiment of the present invention. In the embodiment shown in FIG. 5, method 450, which may also be performed by the TMP module, may perform re-keying without the associated data.

As illustrated, method 450 begins by obtaining an encrypted MAC from memory (block 460). At block 470 this MAC may be decrypted using the old key. Thereafter, the MAC is encrypted with the new key (block 480). Finally, at block 490 the encrypted MAC is sent back for storage in memory. As illustrated, this re-keying performed without the associated data may be more efficient in terms of computation complexity and reduced bandwidth consumption. As with the above method 400, understand that the re-keying shown in method 450 may be performed iteratively for all MACs stored in the given MAC storage and in addition, these re-keying operations may be performed during idle periods of the TMP module and/or when a re-keying timer has expired.

Embodiments thus may be used to detect a rollback. Consider the following scenario:

DL1: Data line value at time t1
DL2: Data line value at time t2
MAC1: MAC associated with DL1
MAC2: MAC associated with DL2
MACKEY1: MAC key at time t1
MACKEY2: MAC key at time t2

If an attacker records DL1 and MAC1 and replays them at time instant t2 (at which point the MAC key has been refreshed), the MAC check will fail as MAC1 was calculated over DL1 using MACKEY1, and the hardware will generate the MAC over DL1 using MACKEY2. Hence, a rollback will be detected. Further this rollback detection occurs based on a re-keying in which only the MAC is fetched from memory for the re-keying. Embodiments thus provide low-overhead confidentiality, integrity, and rollback protection for data in a system memory (and/or other off-chip memory).

Figure 6:
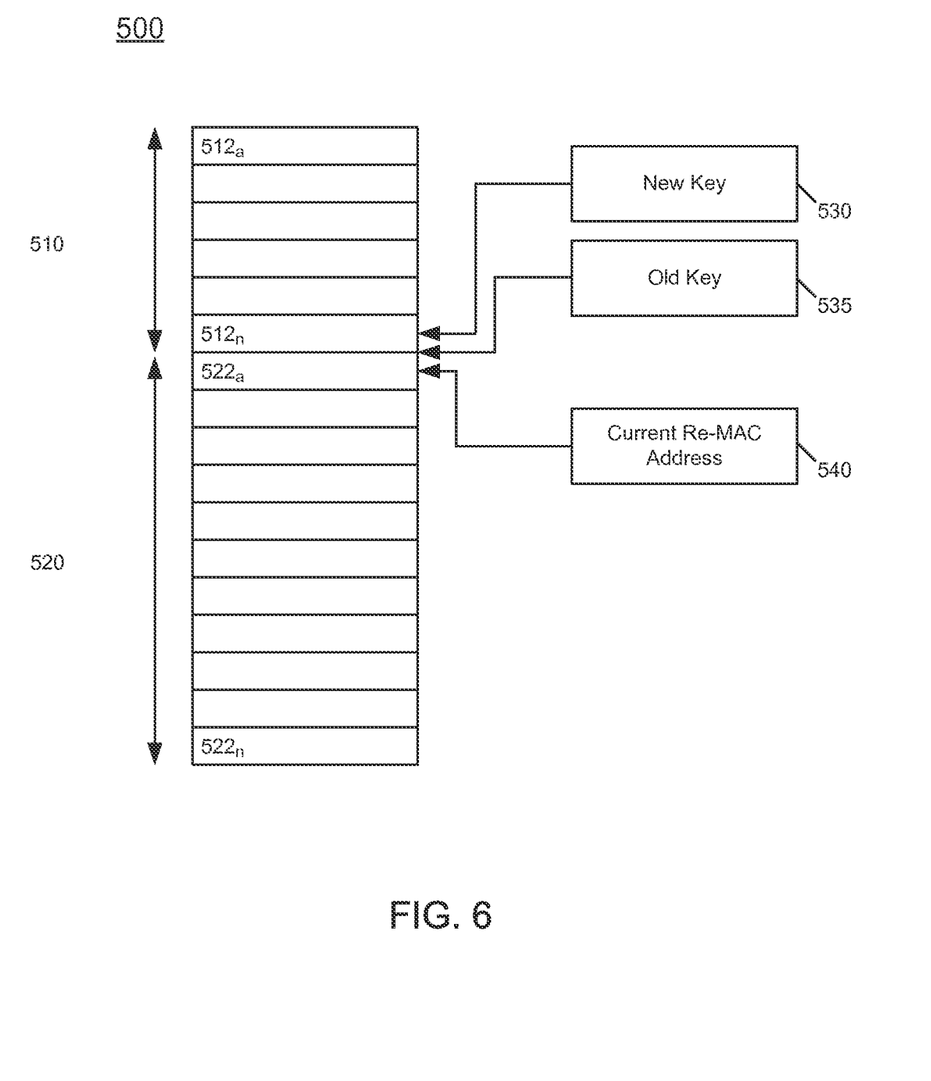
FIG. 6 is a block diagram of a MAC storage in accordance with an embodiment of the present invention.

Referring now to FIG. 6, shown is a block diagram of a MAC storage in accordance with an embodiment of the present invention. MAC storage 500 may be a dedicated cache memory of a processor (such as TMP cache 145 of FIG. 1) or a region of a system memory. As seen, MAC storage 500 includes a first region 510 to store re-keyed MACs and a second region 520 to store MACs generated with a prior key. Thus, entries 512a-512n store MAC values generated with a new key 530, while entries 522a-522n store MAC values generated using an old key 535. A pointer 540 points to a location of the MAC that is currently undergoing re-keying. Understand while shown at this high level in the illustration of FIG. 6, many variations and alternatives are possible. Furthermore, note that while FIG. 6 shows a MAC memory as a contiguous range, embodiments are not so limited. In other cases, MAC values may be stored at non-contiguous locations of a memory. However, understand that such MAC values may have a definite relationship to a corresponding associated data line address such that given a data line address, the corresponding MAC also can be accessed.

Figure 7:
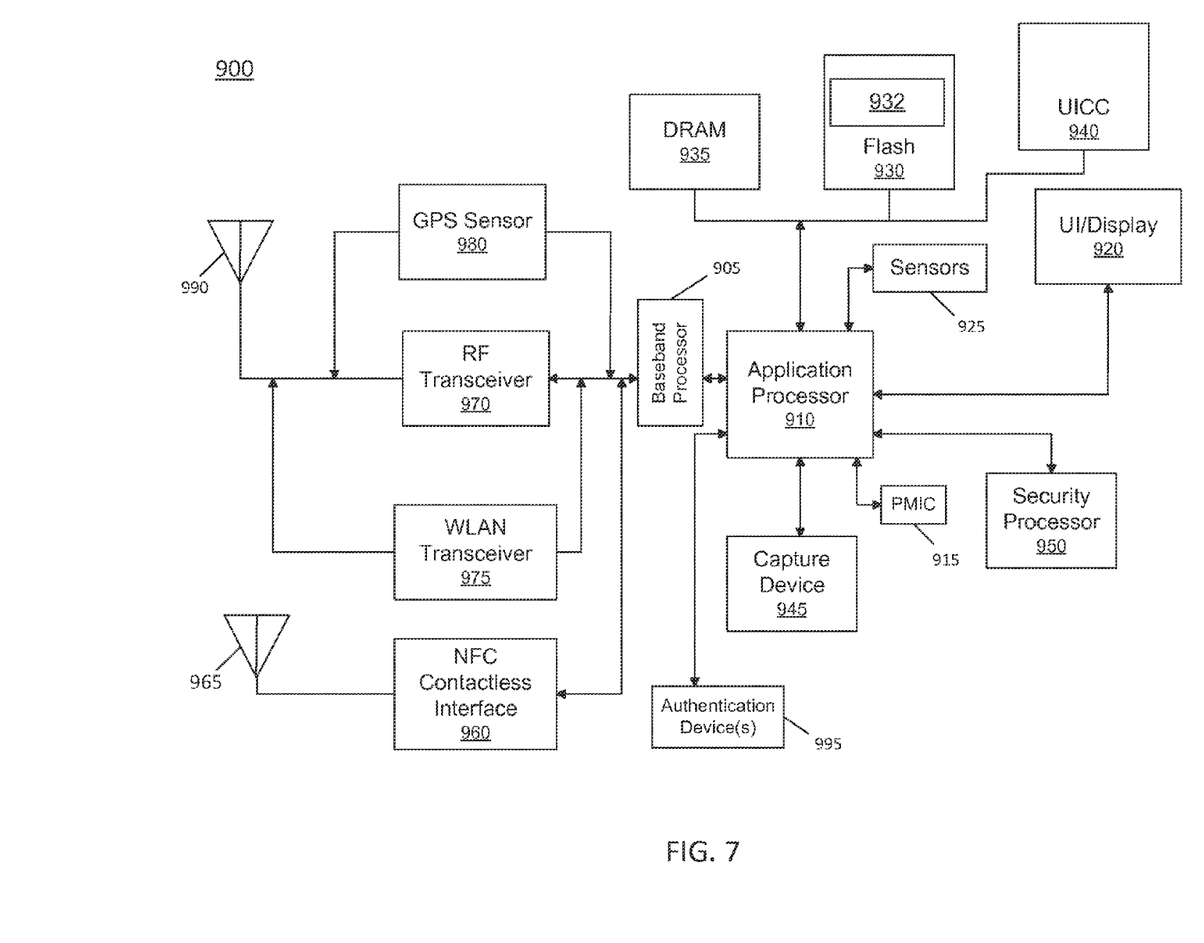
FIG. 7 is a block diagram of an example system with which embodiments can be used.

Embodiments may be implemented in an SoC or other processor for incorporation into a wide variety of platforms. Referring now to FIG. 7, shown is a block diagram of an example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. Application processor 910 may include memory protection logic as described herein to protect information communicated for storage outside of the processor.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which MAC values as described herein may be stored. A similar region may be present in DRAM 935. As further seen, application processor 910 also couples to a capture device 945 such as one or more image capture devices that can record video and/or still images.

Still referring to FIG. 7, a universal integrated circuit card (UICC) 940 comprises a subscriber identity module, which in some embodiments includes a secure storage to store secure user information. System 900 may further include a security processor 950 that may couple to application processor 910. In various embodiments, security processor 950 may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 7, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 8:
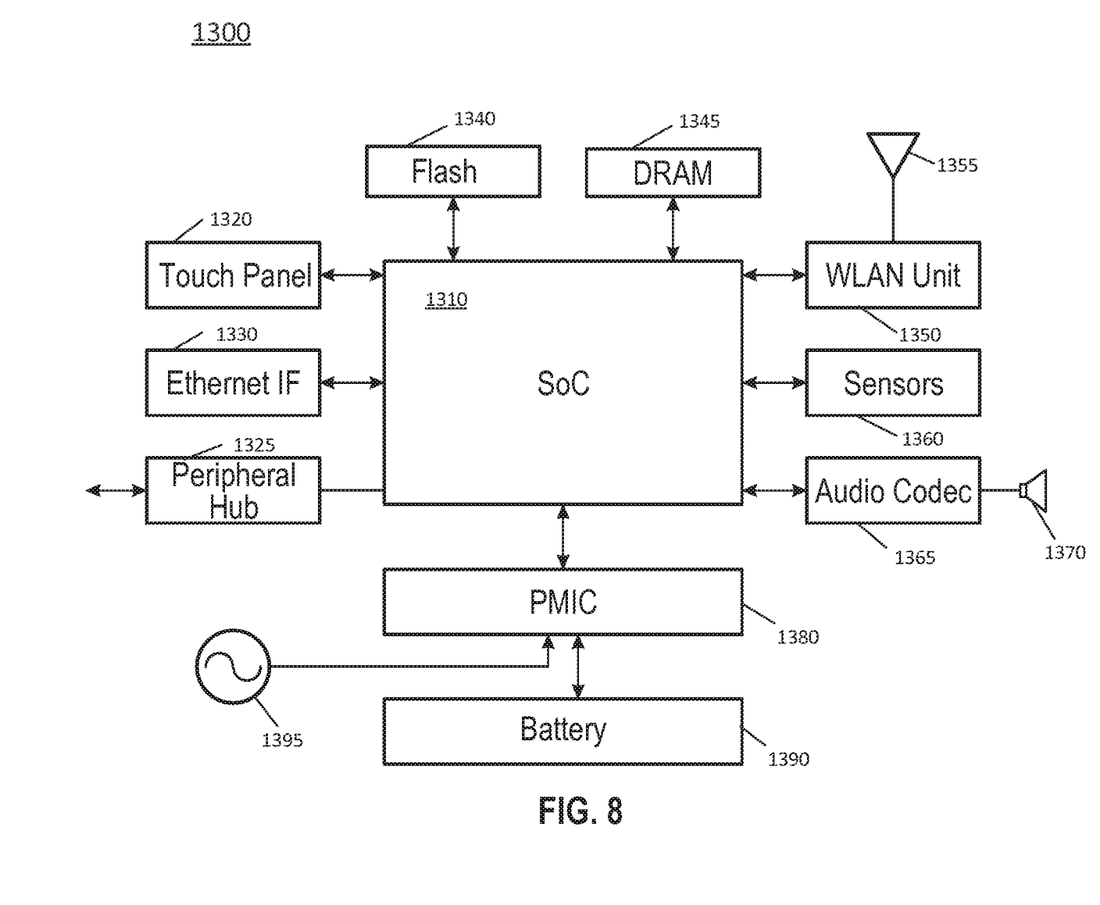
FIG. 8 is a block diagram of an example system with which embodiments may be used.

Referring now to FIG. 8, shown is a block diagram of an example system with which embodiments may be used. In the illustration of FIG. 8, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include hardware, software, and/or firmware as described herein to provide memory protection for storage of information external to SoC 1310.

A variety of devices may couple to SoC 1310. In the illustration shown, a memory subsystem includes a flash memory 1340 and a DRAM 1345 coupled to SoC 1310, both of which may be configured to store encrypted information, including data and MAC values. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 8, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 8, many variations and alternatives are possible.

Figure 9:
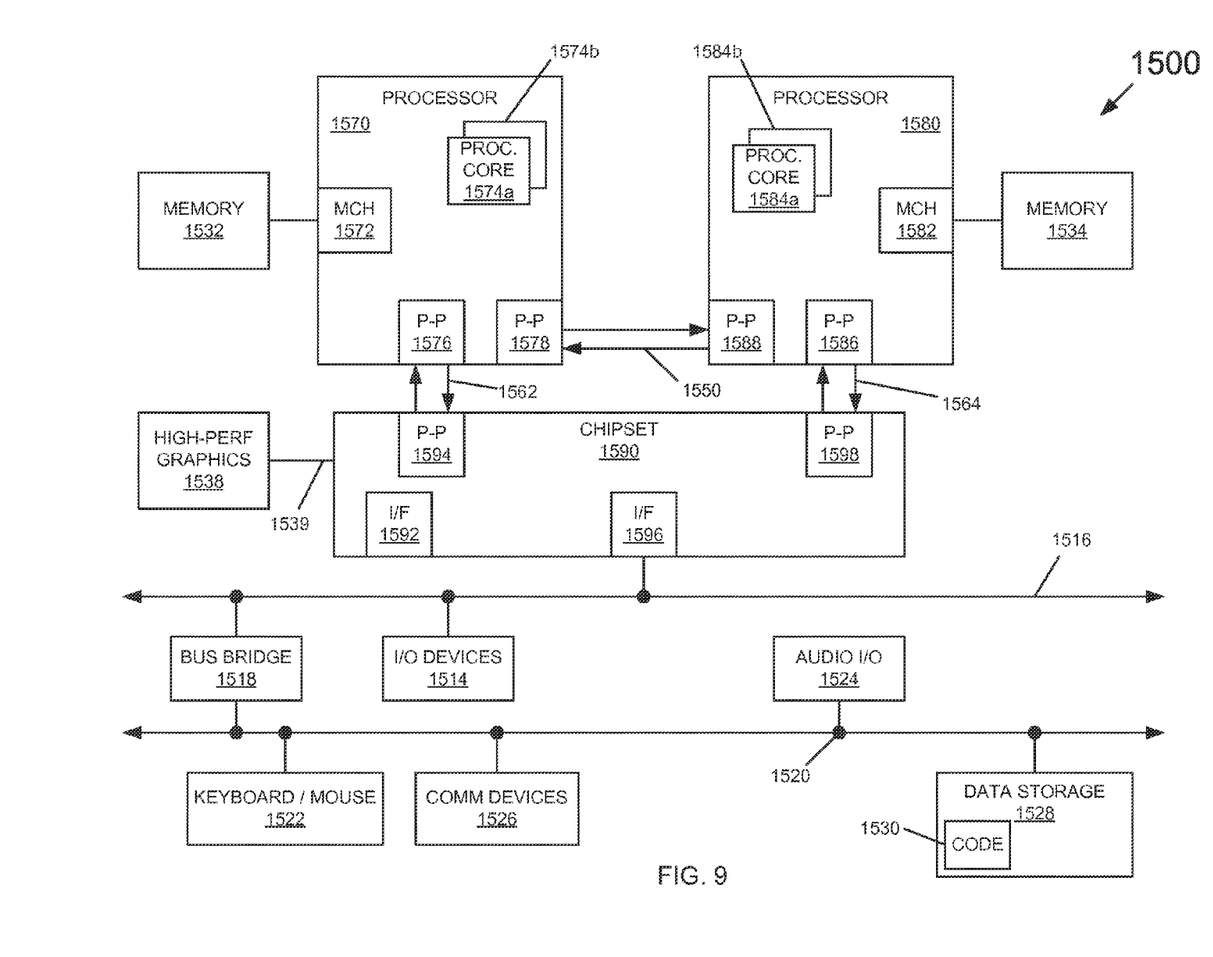
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 1500 is a point-to-point interconnect system, and includes a first processor 1570 and a second processor 1580 coupled via a point-to-point interconnect 1550. As shown in FIG. 9, each of processors 1570 and 1580 may be multicore processors, including first and second processor cores (i.e., processor cores 1574a and 1574b and processor cores 1584a and 1584b), although potentially many more cores may be present in the processors. Each of the processors can include hardware and logic to perform the total memory protection techniques described herein.

Still referring to FIG. 9, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 9, MCH's 1572 and 1582 couple the processors to respective memories, namely a memory 1532 and a memory 1534, which may be portions of system memory (e.g., DRAM) locally attached to the respective processors, and which may be configured to store encrypted information as described herein. First processor 1570 and second processor 1580 may be coupled to a chipset 1590 via P-P interconnects 1562 and 1564, respectively. As shown in FIG. 9, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 9, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530 and one or more manifests, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In Example 1, a method comprises: responsive to a read request, obtaining, in a memory protection logic of a processor, encrypted data from a memory and decrypting the encrypted data according to a data dependent decryption mode to obtain decrypted data; generating a validation integrity value based on the encrypted data; decrypting an encrypted integrity value with a first key, the encrypted integrity value associated with the encrypted data; and providing the decrypted data to a destination based on a comparison of the decrypted integrity value and the validation integrity value.

In Example 2, the method of Example 1 further comprises, if the comparison of the decrypted integrity value and the validation integrity value results in a mismatch, reporting an integrity violation and not providing the decrypted data to the destination.

In Example 3, the method of one or more of the above Examples further comprises obtaining the encrypted integrity value from a cache memory of the processor.

In Example 4, the method of one or more of the above Examples further comprises: generating a first integrity value based on the encrypted data and encrypting the first integrity value with a first key; thereafter decrypting the first integrity value with the first key; and encrypting the first integrity value with a second key to obtain the encrypted integrity value, where the decryption of the first integrity value and the encryption of the first integrity value with the second key are to be performed during a re-keying operation.

In Example 5, the method of Example 4 further comprises: arbitrating between a memory request and the re-keying operation for the first integrity value; and selecting the re-keying operation for the first integrity value when a first priority associated with the re-keying operation is greater than a second priority associated with the memory request.

In Example 6, the method of Example 1 further comprises, according to a re-keying schedule, re-keying a plurality of integrity values each associated with a data segment stored in the memory.

In Example 7, the method of Example 6 further comprises maintaining a pointer to a next integrity value of the plurality of integrity values to be re-keyed.

In Example 8, the method of Example 6 further comprises re-keying at least some of the plurality of integrity values when the memory protection logic is idle.

In Example 9, the method of one or more of the above Examples further comprises providing the decrypted data to the destination before comparison of the decrypted integrity value and the validation integrity value, and if the comparison results in a mismatch, raising a fault to prevent the decrypted data from being committed to a state of the processor.

In Example 10, the method of one or more of the above Examples further comprises: responsive to a write request, receiving in the memory protection logic, unencrypted data from a core; encrypting the unencrypted data according to a data dependent encryption mode to generate the encrypted data; and sending the encrypted data to the memory.

In Example 11, the method of Example 10 further comprises: generating an integrity value based on the encrypted data; encrypting the integrity value with the first key to obtain the encrypted integrity value; and sending the encrypted integrity value to the memory, the encrypted integrity value to be stored in the memory in association with the encrypted data.

In Example 12, a machine-readable storage medium includes machine-readable instructions, when executed, to implement a method of any of the above Examples.

In Example 13, a processor comprises: at least one core to execute instructions; and a memory protection logic to encrypt data to be stored to a memory coupled to the processor, generate a MAC based on the encrypted data, the MAC to have a first value according to a first key, obtain the encrypted data from the memory and validate the encrypted data using the MAC, where the MAC is to be re-keyed to have a second value according to a second key and without the encrypted data.

In Example 14, the memory protection logic is to encrypt all data to be sent to the memory.

In Example 15, the memory protection logic is to enforce confidentiality, integrity and rollback protection.

In Example 16, the processor further comprises a cache memory to store a plurality of MACs, each of the plurality of MACs associated with a portion of data to be stored to the memory.

In Example 17, the processor further comprises a key storage to store the first key and the second key.

In Example 18, the memory protection logic is to obtain the MAC from the memory for the re-keying, while the encrypted data is to remain in the memory.

In Example 19, the memory protection logic is to re-key a region of MACs stored in a storage according to a pointer, where first MACs of the region of MACs stored in the storage at a location below the pointer are keyed with the second key and second MACs of the region stored in the storage at a location above the pointer are keyed with the first key.

In Example 20, a system comprises: a processor including a total memory protection logic to encrypt data to be sent to a system memory according to a data dependent encryption mode, validate integrity of read data obtained from the memory using an integrity value generated by the total memory protection logic before encrypted data of the read data is sent to the system memory, and re-key the integrity value according to a non-deterministic duration; and the system memory coupled to the processor.

In Example 21, the processor further comprises: a cache memory to store a plurality of integrity values each associated with an encrypted data segment to be sent to the system memory.

In Example 22, the total memory protection logic is, responsive to a read request, to obtain the read data from the system memory and decrypt the read data according to a data dependent decryption mode to obtain decrypted read data, generate a validation integrity value based on the encrypted read data, decrypt an encrypted integrity value with a first key, the encrypted integrity value associated with the read data, and provide the decrypted read data to a destination based on a comparison of the decrypted integrity value and the validation integrity value.

In Example 23, the total memory protection logic is, responsive to a write request, to receive unencrypted data from a core, encrypt the unencrypted data according to a data dependent encryption mode to generate the encrypted data, and send the encrypted data to the system memory.

In Example 24, the total memory protection logic is to generate the integrity value based on the encrypted data, encrypt the integrity value with a first key and send the encrypted integrity value to the system memory, the encrypted integrity value to be stored in the system memory in association with the encrypted data.

In Example 25, an apparatus comprises: means for obtaining encrypted data from a memory and decrypting the encrypted data according to a data dependent decryption mode to obtain decrypted data; means for generating a validation integrity value based on the encrypted data; means for decrypting an encrypted integrity value with a first key, the encrypted integrity value associated with the encrypted data; and means for providing the decrypted data to a destination based on a comparison of the decrypted integrity value and the validation integrity value.

In Example 26, the apparatus further comprises means for reporting an integrity violation and not providing the decrypted data to the destination, if the comparison of the decrypted integrity value and the validation integrity value results in a mismatch.

In Example 27, the apparatus further comprises means for obtaining the encrypted integrity value from a cache memory.

In Example 28, the apparatus further comprises: means for generating a first integrity value based on the encrypted data and encrypting the first integrity value with a first key; means for decrypting the first integrity value with the first key; and means for encrypting the first integrity value with a second key to obtain the encrypted integrity value, where the decryption of the first integrity value and the encryption of the first integrity value with the second key are to be performed during a re-keying operation.

In Example 29, the apparatus further comprises: means for arbitrating between a memory request and the re-keying operation for the first integrity value; and means for selecting the re-keying operation for the first integrity value when a first priority associated with the re-keying operation is greater than a second priority associated with the memory request.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable medium comprising instructions that when executed cause a system to:

responsive to a read request from a hardware core of a processor, obtain, in a memory protection logic of the processor, encrypted data from a memory and decrypt the encrypted data according to a data dependent decryption mode to obtain decrypted data;

generate a validation integrity value based on the encrypted data;

decrypt an encrypted integrity value with a first key, the encrypted integrity value associated with the encrypted data;

provide the decrypted data to the hardware core of the processor based on a comparison of the decrypted integrity value and the validation integrity value if the decrypted integrity value matches the validation integrity value, and if the decrypted integrity value does not match the validation integrity value, report an integrity violation and not provide the decrypted data to the hardware core of the processor;

obtain the encrypted integrity value from the memory and again decrypt the encrypted integrity value with the first key;

encrypt the decrypted integrity value with a second key to obtain a second encrypted integrity value, wherein the decryption again of the encrypted integrity value and the encryption of the integrity value with the second key are performed during a re-keying operation; and according to a re-keying schedule, re-key a plurality of integrity values each associated whit a data segment stored in the memory;

arbitrate between a memory request and the re-keying operation for the integrity value; and select the re-keying operation for the integrity value when a first priority associated with the re-keying operation is greater than a second priority associated with the memory request.

2. The at least one non-transitory computer readable medium of claim 1, further comprising instructions that when executed cause the system to obtain the encrypted integrity value from a cache memory of the processor.

3. The at least one non-transitory computer readable medium of claim 1, further comprising instructions that when executed cause the system to maintain a pointer to a next integrity value of the plurality of integrity values to be re-keyed.

4. The at least one non-transitory computer readable medium of claim 1, further comprising instructions that when executed cause the system to re-key at least some of the plurality of integrity values when the memory protection logic is idle.

5. The at least one non-transitory computer readable medium of claim 1, further comprising instructions that when executed cause the system to provide the decrypted data to the hardware core of the processor before comparison of the decrypted integrity value and the validation integrity value, and if the comparison results in a mismatch, raise a fault to prevent the decrypted data from being committed to a state of the processor.

6. The at least one non-transitory computer readable medium of claim 1, further comprising instructions that when executed cause the system to:
   responsive to a write request, receive in the memory protection logic, unencrypted data from the hardware core of the processor;
   encrypt the unencrypted data according to a data dependent encryption mode to generate the encrypted data; and
   send the encrypted data to the memory.

7. The at least one non-transitory computer readable medium of claim 6, further comprising instructions that when executed cause the system to:
   generate an integrity value based on the encrypted data;
   encrypt the integrity value with the first key to obtain the encrypted integrity value; and
   send the encrypted integrity value to the memory, the encrypted integrity value to be stored in the memory in association with the encrypted data.

8. A processor comprising:
   at least one core to execute instructions; and
   a memory protection logic comprising hardware circuitry to encrypt data to be stored to a memory coupled to the processor, generate a message authentication code (MAC) based on the encrypted data, the MAC to have a first value according to a first key, obtain the encrypted data from the memory and validate the encrypted data using the MAC, wherein the MAC is re-keyed to have a second value according to a second key and without the encrypted data, wherein the memory protection logic is configured to re-key a region of MACs stored in a storage according to a pointer, wherein first MACs of the region of MACs stored in the storage at a location below the pointer are keyed with the second key and second MACs of the region stored in the storage at a location above the pointer are keyed with the first key.

9. The processor of claim 8, wherein the memory protection logic is configured to encrypt all data to be sent to the memory.

10. The processor of claim 8, wherein the memory protection logic is configured to enforce confidentiality, integrity and rollback protection.

11. The processor of claim 8, wherein the processor further comprises a cache memory to store a plurality of MACs, each of the plurality of MACs associated with a portion of data to be stored to the memory.

12. The processor of claim 11, wherein the processor further comprises a key storage to store the first key and the second key.

13. The processor of claim 8, wherein the memory protection logic is configured to obtain the MAC from the memory for the re-keying; while the encrypted data is to remain in the memory.

* * * * *